United States Patent
Calyanakoti et al.

(10) Patent No.: US 7,225,434 B2
(45) Date of Patent: May 29, 2007

(54) METHOD TO COLLECT ADDRESS TRACE OF INSTRUCTIONS EXECUTED

(75) Inventors: Rangarajan R. Calyanakoti, Bridgewater, NJ (US); Veerasham Bukka, Hillsboro, OR (US); Manish Singh, San Diego, CA (US); Brian James Pollard, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 605 days.

(21) Appl. No.: 10/672,967

(22) Filed: Sep. 25, 2003

(65) Prior Publication Data

US 2005/0071819 A1    Mar. 31, 2005

(51) Int. Cl.
*G06F 9/44* (2006.01)
(52) U.S. Cl. ................................. 717/130
(58) Field of Classification Search ............ 717/128, 717/130
See application file for complete search history.

(56) References Cited

U.S. PATENT DOCUMENTS

| | | | | |
|---|---|---|---|---|
| 5,274,811 A | * | 12/1993 | Borg et al. | 717/128 |
| 6,009,270 A | * | 12/1999 | Mann | 717/128 |
| 6,173,395 B1 | * | 1/2001 | Wisor et al. | 712/236 |
| 6,247,170 B1 | * | 6/2001 | Giroux | 717/131 |
| 6,249,906 B1 | * | 6/2001 | Levine et al. | 717/153 |
| 6,263,488 B1 | * | 7/2001 | Fortin et al. | 717/127 |
| 6,467,083 B1 | * | 10/2002 | Yamashita | 717/128 |
| 6,681,321 B1 | * | 1/2004 | Dale et al. | 712/227 |
| 6,968,546 B2 | * | 11/2005 | Lueh | 717/158 |

FOREIGN PATENT DOCUMENTS

JP        2000076094 A  *  3/2000

OTHER PUBLICATIONS

Agarwa, Anant; Sites, Richard L; Horowitz, Mark; "ATUM: A New Technique for Capturing Address Traces Using Microcode", p. 119-127, 1986 IEEE retrieved Jul. 11, 2006.*
Ball, Thomas; Laurs, James R.; "Optimally Profiling and Tracing Programs", p. 1319-1360, 1994 ACM, retrieved Jul. 11, 2006.*
Chen, Bing; Ali, Musawir; "Trace Cache", p. 1-6, <URL www.cs.ucf.edu/~mali/TraceCache.doc>, retrieved Jul. 11, 2006 from www.google.com search.*
Oliver, Richard L; Teller, Patricia J; "Generating Dynamically Scheduled Memory Address Traces", p. 245-250, 1998 IEEE, retrieved Jul. 11, 2006.*

* cited by examiner

*Primary Examiner*—Mary J. Steelman
(74) *Attorney, Agent, or Firm*—Blakely, Sokoloff, Taylor & Zafman LLP (57) ABSTRACT

A method to collect address trace of instructions executed by a processor has been disclosed. An embodiment of the method includes receiving a software program having a set of instructions and performing instrumentation on the software program to determine addresses of the instructions of the software program in the order in which the instructions are executed by a processor.

23 Claims, 5 Drawing Sheets

METHOD TO COLLECT ADDRESS TRACE OF INSTRUCTIONS EXECUTED

FIELD OF INVENTION

The present invention relates to computer programming, and more particularly, to collecting addresses of instructions in a computer program.

BACKGROUND

Typically, to build software executable on a processor, one or more program files written in a high level programming language, such as, C, C++, JAVA, etc., are compiled to generate one or more intermediate files in object code or assembly languages. The intermediate files may then be optionally linked to form an executable.

Software executable on a processor is usually loaded in a memory as one or more files containing text and data. The text, which is also referred to as the code part or the code segment, contains the encoded instructions that are executed to perform the business logic of the software. The processor loads successive instructions from the memory and executes them in its execution unit. Loops, branches, and program counter modifying instructions cause changes in the program flow and cause the execution of many instructions more than once and in different orders based on several run-time flow and conditions that the software might experience. To fetch these instructions, the processor reads from the memory at various addresses at which these instructions are stored.

By studying the address trace of the instructions executed, one can improve the efficiency of various hardware components and software operations, such as, the memory controller hub, memory caches, memory banking, memory paging, etc. In particular, software developers use the instruction addresses to identify the most frequently used portions of computer programs, which is helpful in improving the efficiency of the programs, memory usage, etc. For example, appropriate portions of the computer programs may also be locked in fast memory or caches to improve the efficiency of program execution. Analysis of the address information also helps one to procure source code coverage of the computer programs.

BRIEF DESCRIPTION OF THE DRAWINGS

The present invention will be understood more fully from the detailed description that follows and from the accompanying drawings, which however, should not be taken to limit the appended claims to the specific embodiments shown, but are for explanation and understanding only.

DETAILED DESCRIPTION

A method and an article of manufacture for generating instrumented software to collect addresses of instructions in a software program in the order in which the instructions are executed by a processor is disclosed in the following description. Numerous specific details are set forth in the description. However, it is understood that embodiments of the invention may be practiced without these specific details. In other instances, well-known modules, structures, and techniques have not been shown in detail in order not to obscure the understanding of this description.

Some portions of the detailed descriptions that follow are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Instrumentation is a technique to alter a software program to achieve certain specific goals. Alteration may be done on software program in a variety of forms, such as, source code files written in high level languages, intermediate files, like assembly or object files, or final executable in binary code. In the following description, instrumentation generally refers to inserting certain instructions in a software program. In one embodiment, the instrumented software executes original instructions in the software and outputs the address trace of the original instructions executed. In one embodiment, an instrumentation source block (ISB) is inserted before an instruction in a program to determine the address of the instruction during execution of the program. The file with the ISB is hereinafter referred to as the instrumented software.

Figure 1A:
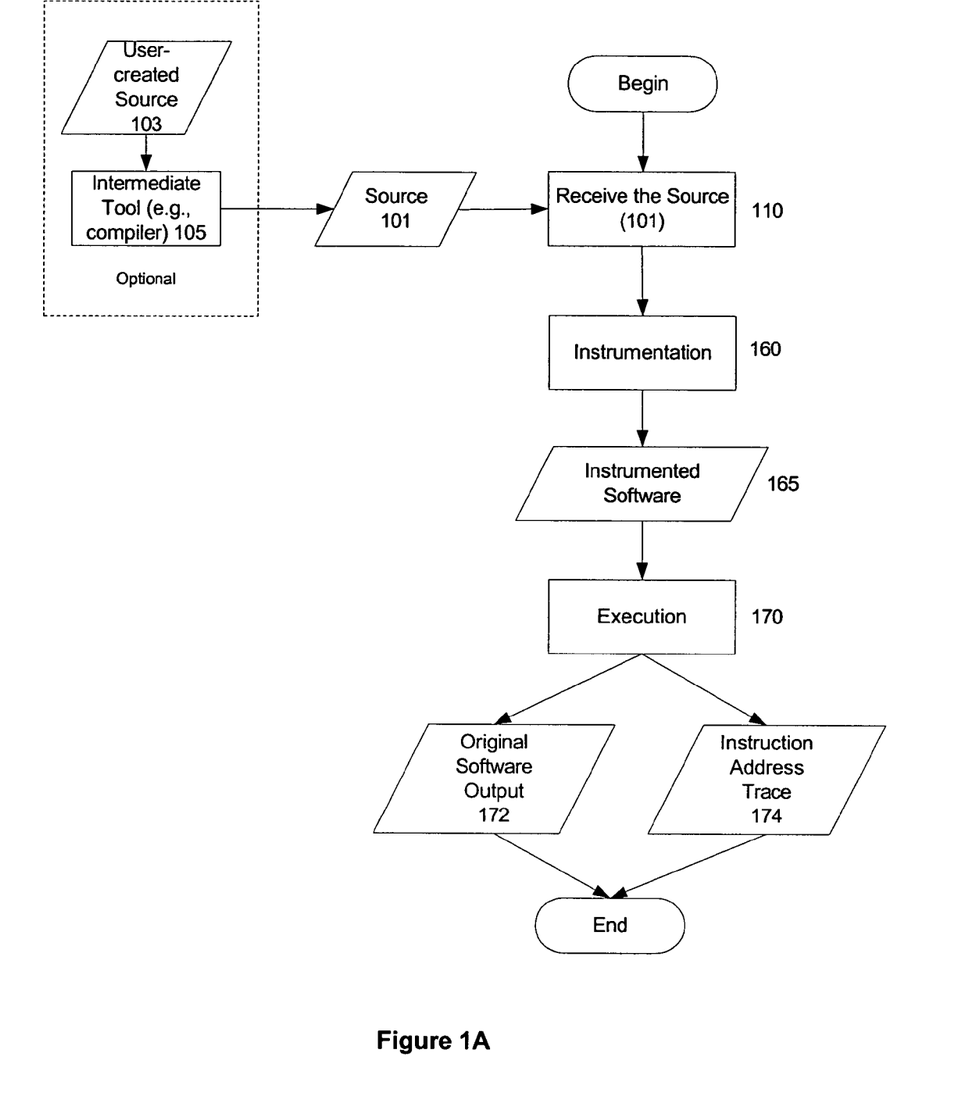
FIG. 1A shows a flow diagram of an embodiment of a process for generating an output file to collect address trace of instructions executed.

FIG. 1A shows a flow diagram of an embodiment of a process to collect addresses of instructions in a software program executed in time order. The process is performed by processing logic that may comprise hardware (e.g., circuitry, dedicated logic, etc.), software (such as is run on a general purpose computer system or a dedicated machine), or a combination of both. The source 101 is in a format, where each instruction is discretely identifiable. The source 101 may be in assembly code, object code, binary code, etc. In contrast, a source that is in a format where the instructions are non-discretely identifiable, such as source 103, has to be converted into a format where individual instructions are discretely identifiable. In one embodiment, the source 101 is derived from a user-created source 103, in which individual instructions are not discretely identifiable. The user-created source 103 may be coded in a high level programming language, such as, C, C++, JAVA, etc. In one embodiment, the user-created source 103 is input to the processing block 105 to generate the source 101. The processing block 105 may include a compiler or a linker to generate the source 101. However, one should appreciate that the source 101 may be generated in other manners.

Processing logic receives the source 101 (processing block 110) and performs instrumentation on the source 101 (processing block 160) to generate an instrumented software (data block 165). More details of instrumentation are discussed below. Processing logic executes the instrumented software (processing block 170) to generate the output 172 originally intended by the user-created source (source 101 or source 103) and the address trace 174 of the instructions in the source 101.

Figure 1B:
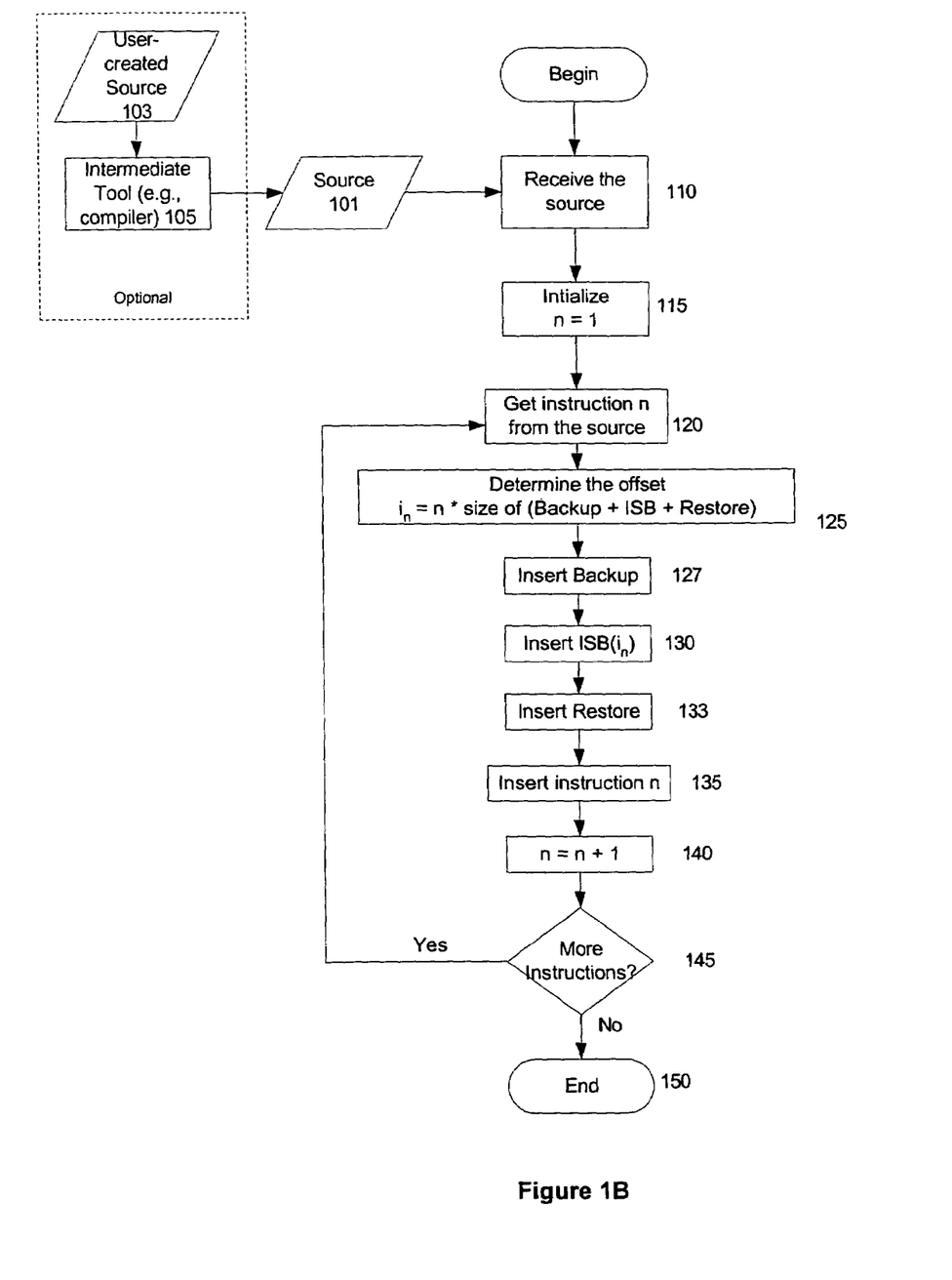
FIG. 1B shows a flow diagram of one embodiment of a process to instrument the software.

FIG. 1B shows a flow diagram of an embodiment of a process to instrument software. The instrumented software when executed would output the addresses of the instructions in the order in which they are executed. The process is performed by processing logic that may comprise hardware (e.g., circuitry, dedicated logic, etc.), software (such as is run on a general purpose computer system or a dedicated machine), or a combination of both. The individual instructions in the source 101 are discretely identifiable. The source 101 may include assembly code, object code, binary code, etc. In one embodiment, the source 101 is derived from a user-created source 103, which is in a high level programming language, such as, C, C++, JAVA, etc. In one embodiment, the user-created source 103 is input to the processing block 105 to generate the source 101. The processing block 105 may include a compiler or a linker to generate the source 101. However, one should appreciate that the source 101 may be generated in other manners.

Processing logic receives the source 101 of a software program (processing block 110). In one embodiment, processing logic initializes an index, n (processing block 115). Processing logic then retrieves instruction n from the source 101 (processing block 120). Processing logic determines an offset caused by the additional instructions inserted so far for instrumentation of the software program, i.e., until and including the instructions added by inserting the nth ISB (processing block 125). Processing logic then inserts the instructions for storing the context (Backup) (processing block 127), the ISB (processing block 130), and the instructions for restoring the context (Restore) (processing block 133). The determination and the use of the offset will be further discussed in the examples below. More details on the context, as well as storing and restoring the context are described in a later section. Processing logic then inserts the instruction n in the instrumented software (processing block 135). In one embodiment, processing logic increments n (processing block 140) and checks whether there are any more instructions in the source 101 (processing block 145). If there is, processing logic repeats the processing blocks 120–145 in one embodiment. Otherwise, processing ends (processing block 150).

In one embodiment, the ISB includes instructions to determine the address of the corresponding instruction executed after the ISB. In one embodiment, the ISB includes instructions that branch to another module or library that contains instructions to determine instruction address.

In one embodiment, an individual inserts the ISB into the source 101. In an alternate embodiment, the ISB is inserted automatically into the source 101 by a tool, such as, for example, a script. In one embodiment, the instrumented software may be further modified. In one embodiment, an ISB is inserted before every instruction. In one embodiment, an ISB is inserted before only some of the instructions. In one embodiment, instructions that have to be executed consecutively are identified and no ISB is inserted in between these instructions. Furthermore, when an ISB cannot be inserted amidst consecutive lines of code, the size of the ISB may differ from other ISBs inserted in other parts of the source 101. However, one should appreciate that the exact size of each ISB and the instructions within the ISB are machine specific. In one embodiment, the ISB outputs the address of the instruction following the ISB during the execution of the instrumented software. In one embodiment, the processor executing the instrumented software includes one or more control registers, such as, for example, the program counter or the link register. The control registers contain the addresses of the instructions to be executed next. In one embodiment, the ISB determines the address of the following instruction using the contents of the control registers.

In one embodiment, an individual codes the ISB in a format where individual instructions are discretely identifiable, such as, for example, in binary code or assembly code. In an alternate embodiment, an individual first codes the ISB in a high level programming language, such as, C, C++, JAVA, etc., and then the ISB is converted into another format, such as, assembly code or binary object code, using a tool, such as a compiler, so that each instruction is discretely identifiable. A user may further modify the resulting ISB as appropriate. The exact instructions in the ISB are dependent on the processor that executes the program because each processor may have its own instruction set.

In one embodiment, the processor fetches successive instructions from the memory and executes the instructions fetched in an execution unit of the processor. In one embodiment, the inserted ISB is executed to output the address or addresses of an instruction or instructions executed for which this ISB is inserted. Certain instructions may cause a break in the sequence of the flow of instructions, such as, for example, branch instructions, instructions that modify the value of the program counter, etc. An ISB placed after such an instruction will not necessarily be executed even when the instruction has been executed because the program flow may jump to an instruction other than the ISB following the instruction. Therefore, the ISB for determining the address of an instruction is placed before the corresponding instruction to ensure that the ISB is executed whenever the instruction is executed.

One embodiment of a processor maintains run-time status information affecting the execution of the instructions in the program. In one embodiment, the information is maintained in various control and status registers. In one embodiment, the processor provides a set of registers for manipulating program data. The set of registers may include a number of general-purpose registers (GPRs). An embodiment of the ISB may use one or more of the GPRs. The control and status information in the registers are hereinafter referred as the context. In one embodiment, the inserted ISB alters the current context of the software executing on the processor, and hence, affects the execution of the software. Therefore, in one embodiment, additional instructions are inserted to store the context before an ISB and to restore the context after the ISB. The example shown in FIGS. 2A and 2B illustrates the concept discussed above.

Figure 2A:
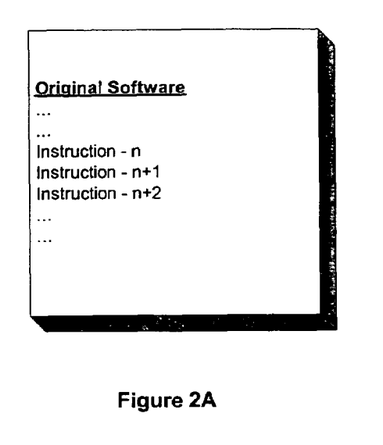
FIG. 2A shows a section in a sample software.
Figure 2B:
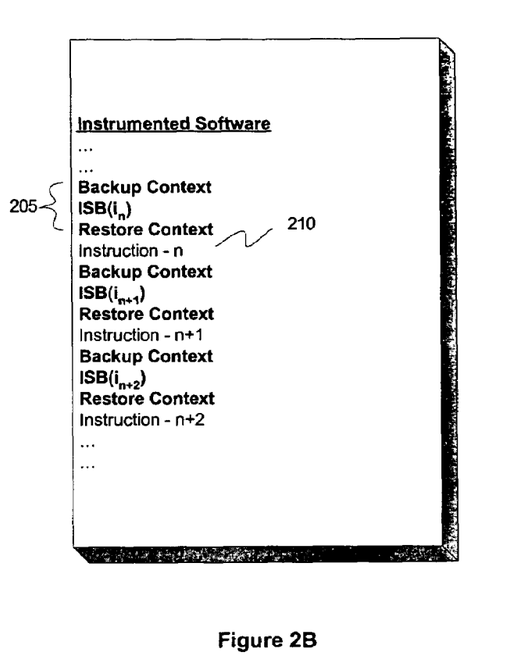
FIG. 2B shows the instrumented code generated by an embodiment of a process to instrument the software.

Referring to FIG. 2A, a section of an example of the source is shown. The section includes instructions n through n+2. The amount of instrumentation, i.e., the number of instructions inserted during instrumentation, before instruction n is $i_n$. After performing one embodiment of the process to instrument the source in FIG. 2A, the instrumented software in FIG. 2B is resulted. The instructions to store the context are represented as "Backup Context" in FIG. 2B, and likewise, the instructions to restore the context are represented as "Restore Context" in FIG. 2B. Referring to FIG. 2B, a "Backup Context," an ISB, and a "Restore Context" are inserted before each of instructions n through n+2. For example, the instructions 205 are inserted before instruction n 210 in FIG. 2B. Furthermore, the instrumentation may cause a skew in the instruction address. The skew is discussed in details below. In one embodiment, the amount of instrumentation inserted before each instruction is provided to the corresponding ISB as an offset for determining the non-skewed address of the instruction.

In one embodiment, the instruction addresses of the instrumented software are skewed because the instructions for storing the context, the ISB, and the instructions for restoring the context themselves add one or more instructions into the instrumented software. The instructions added skew the addresses of the original instructions in the instrumented source. The skew may be removed by providing each ISB with the amount of instrumentation done prior to the corresponding instruction in the source. In one embodiment, the offset includes both the skew introduced by the ISB and the associated instructions that backup and restore the context. Using the offset, one embodiment of the ISB calculates the address of the corresponding original instruction. Hence, the resulting execution of the instrumented software would output the instruction addresses without skew. The technique of skew removal is further illustrated by the example shown in FIGS. 3A and 3B.

Figure 3A:
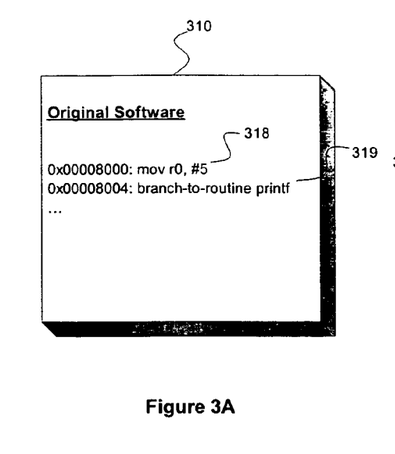
FIG. 3A shows a section in a sample software.
Figure 3B:
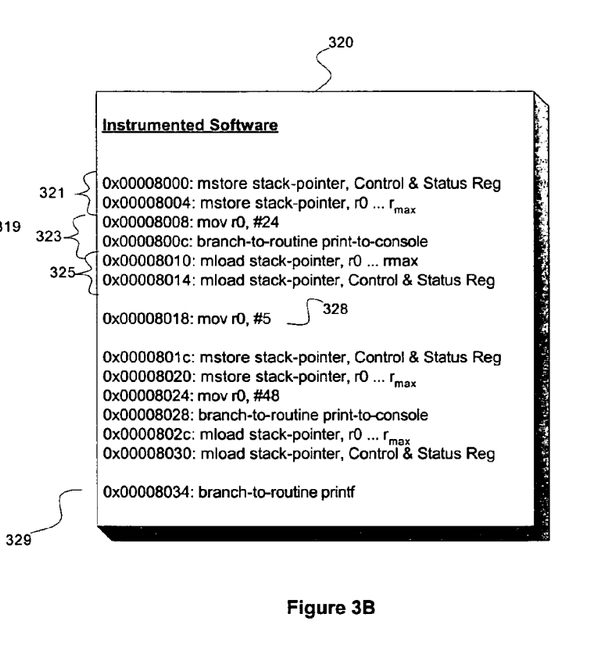
FIG. 3B shows the instrumented code generated by one embodiment of a process to instrument the software.

FIG. 3A shows an example of a source 310. In one embodiment, the instrumented software 320 in FIG. 3B is generated from the source 310 in FIG. 3A by the process illustrated in FIG. 1B. The hexadecimal number in front of each instruction is the address of the instruction. Each instruction in FIGS. 3A and 3B has a size of 4 bytes in one embodiment. Instructions of other sizes, such as, for example, 8 bytes, 16 bytes, etc., may be used in other embodiments. For the purpose of illustration, only two of the instructions in the source 310 are shown in FIG. 3A, namely, 318 and 319. However, it should be apparent to one of ordinary skill in the art that a source may include various numbers of instructions. Furthermore, one should appreciate that the type of instructions shown in FIG. 3A is for illustration only and the appended claims are not limited to any particular type of instructions. The instructions 318 and 319 in FIG. 3A correspond to the instructions 328 and 329 in FIG. 3B respectively. For each of the instructions 318 and 319, instructions to store the context, an ISB, and instructions to restore the context are inserted before the instruction in the instrumented software 320. For example, the instructions 321 to store the context, the ISB 323, and the instructions 325 to restore the context are inserted before the original instruction 328 in the instrumented software 320.

Referring to FIG. 3B, the ISB includes a "branch-to-routine print-to-console" instruction to cause the processor to jump to the "print-to-console" routine to print the address of each of the corresponding original instructions 328 and 329 onto the console. In an alternate embodiment, another routine or section of code is used to make the instrumented software to output the address of the original instruction to another medium, such as, for example, a text document. In one embodiment, the text document is sent to a printer to be printed. In one embodiment, the addresses of the original instructions are output into a file to be further analyzed by a processing logic, which may include software, hardware, or a combination of both. The additional instructions of the routine print-to-console may be in a binary object file or a binary library. However, one may take into account of the skew caused by the additional instructions of the routine print-to-console. In one embodiment, the instructions from the binary object file or the binary library are added at the end of the list of program binary files or assembly files provided to the linker in order to avoid introducing a skew to the address of the original instructions in the program. In an alternate embodiment, the instructions to implement routines, such as, print-to-console, are embedded in the ISB itself, and thus, obviating the need for an additional library or binary file.

In addition to the "branch-to-routine print-to-console" instruction, the embodiment of the ISB in FIG. 3B includes a "mov r0" instruction to provide an offset (or a parameter in terms of software programming terminology) to the routine, "print-to-console." As discussed above, the ISB and the instructions to store and to restore the context introduce a skew in the address of the original instruction in the instrumented software 320. The "mov r0" instruction puts an offset corresponding to the amount of instrumentation inserted so far into register r0. In one embodiment, the offset includes the number of the instructions added to store the context, the ISB, as well as the instructions to restore the context that have been inserted so far. For example, referring to FIG. 3B, there are 6 instructions added before each original instruction. Since the instruction 318 is the first instruction in the source 310 in FIG. 3A, therefore, an offset of 6 instructions*4 bytes/instruction=24 bytes is provided to the ISB 323 corresponding to the original instruction 318. Likewise, an offset of 2*6 instructions*4 bytes/instruction=48 is provided to the corresponding ISB of the second original instruction 319.

As mentioned above, the instructions 328 and 329 in the instrumented software 320 in FIG. 3B correspond respectively to the original instructions 318 and 319 in the source 310 in FIG. 3A. One would expect to output the instruction addresses of the instructions 318 and 319, i.e., 0x00008000 and 0x00008004 as the address trace of the instructions of the sample software as shown in FIG. 3A. But as can be seen, the addresses of the corresponding instructions 328 and 329 in the instrumented software 320, i.e., 0x00008018 and 0x00008034, are different, and hence, skewed. During instrumentation, ISBs and instructions to store and to restore the context are inserted into the instrumented software, causing skews in the original instructions of the source 310. Thus, the offsets are provided to the corresponding ISB's to remove the skew. To print the addresses of the instructions in the original source 310 in time order, the skews are removed before printing the addresses. To remove the skew, the "print-to-console" routine subtracts the offset from the address of the corresponding original instruction in the instrumented software 320. For example, the address of the instruction 328 in the instrumented software 320 is 0x00008018. The offset provided to the ISB corresponding to the instruction 328 is 24 (i.e., 0x00000018). Therefore, the address of the instruction 328 after removing the skew is 0x00008018−0x00000018=0x00008000 which is the address of the corresponding original instruction 318. In one embodiment, the "print-to-console" routine uses one or more registers, such as, for example, the link register, to calculate the address of the corresponding original instruction.

One should appreciate that the instructions and the assembly code shown in the above examples are for the purpose of illustration only. They should not be construed to limit the appended claims to any particular type of code or any particular processor supporting a certain type of assembly code or object code.

In one embodiment, the instrumented software is passed through one or more tools, such as, for example, a linker, to be converted into an executable file. In an alternate embodiment, the instrumented software itself is already in a format executable by a processor. In one embodiment, a processor in a computer system runs the executable file. In one embodiment, during execution of the instrumented software, the ISB in the executable file determines and outputs the addresses of the instructions in the source 101 (referring to FIG. 1) in the order in which the instructions are executed by the processor.

Figure 4:
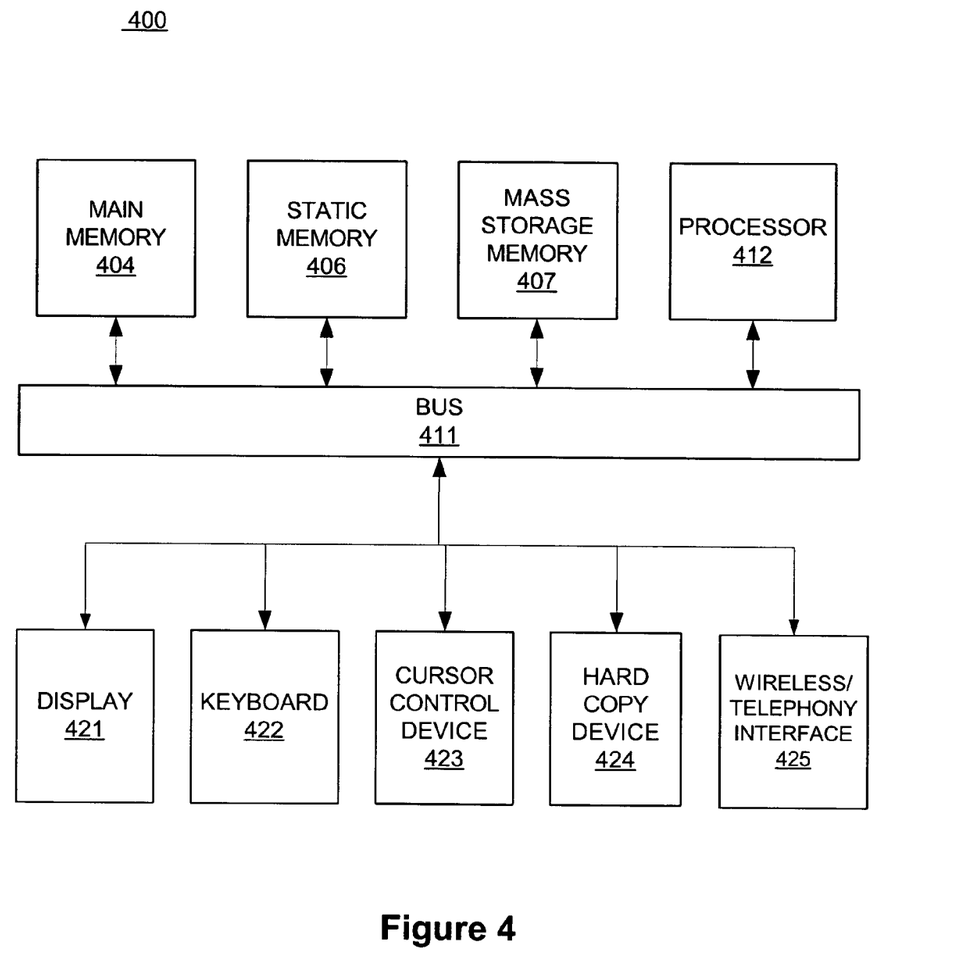
FIG. 4 shows an exemplary embodiment of a computer system.

In one embodiment, one or more of the operations described above are implemented by a computer system. FIG. 4 shows an exemplary embodiment of a computer system. The computer system 400 comprises a communication mechanism or bus 411 for communicating information, and a processor 412 coupled with bus 411 for processing information. Processor 412 includes a microprocessor, but is not limited to a microprocessor, such as, for example, Pentium®, Itanium®, PowerPC®, etc.

System 400 further comprises a dynamic random access memory (DRAM), or other dynamic storage device 404 (referred to as main memory) coupled to bus 411 for storing information and instructions to be executed by processor 412. Main memory 404 also may be used for storing temporary variables or other intermediate information during execution of instructions by processor 412.

Computer system 400 also comprises a read only memory (ROM) and/or other static storage device 406 coupled to bus 411 for storing static information and instructions for processor 412, and a data storage device 407, such as a magnetic disk or optical disk and its corresponding disk drive. Mass storage device 407 is coupled to bus 411 for storing information and instructions.

Computer system 400 may further be coupled to a display device 421, such as a cathode ray tube (CRT) or liquid crystal display (LCD), coupled to bus 411 for displaying information to a computer user. An alphanumeric input device 422, including alphanumeric and other keys, may also be coupled to bus 411 for communicating information and command selections to processor 412. An additional user input device is cursor control 423, such as a mouse, trackball, track pad, stylus, or cursor direction keys, coupled to bus 411 for communicating direction information and command selections to processor 412, and for controlling cursor movement on display 421.

Another device that may be coupled to bus 411 is hard copy device 424, which may be used for printing instructions, data, or other information on a medium such as paper, film, or similar types of media. Furthermore, a sound recording and playback device, such as a speaker and/or microphone may optionally be coupled to bus 411 for audio interfacing with computer system 400. Another device that may be coupled to bus 411 is a wired/wireless communication capability 425 to communication to a phone or handheld palm device. Note that any or all of the components of system 400 and associated hardware may be used in various embodiments of the present invention. However, it can be appreciated that other configurations of the computer system may include some or all of the devices.

The foregoing discussion merely describes some exemplary embodiments of the present invention. One skilled in the art will readily recognize from such discussion, the accompanying drawings and the claims that various modifications can be made without departing from the spirit and scope of the appended claims. The description is thus to be regarded as illustrative instead of limiting.

What is claimed is:

1. A method comprising:
receiving a software program having a plurality of instructions; and
performing instrumentation on the software program to determine a plurality of addresses of the plurality of instructions of the software program in the order in which the plurality of instructions are executed by a processor, comprising inserting a plurality of store instructions before one or more instructions of the plurality of instructions within the software program to store content of a plurality of registers of the processor and a plurality of restore instructions before the one or more instructions of the plurality of instructions to restore the content of the plurality of registers of the processor.

2. The method of claim 1, wherein performing instrumentation on the software program comprises inserting an instrumentation source block (ISB) before the one or more instructions of the plurality of instructions to determine one or more address of the one or more instructions in the software program.

3. The method of claim 2, further comprising providing an offset to the ISB to remove a skew in the one or more addresses caused by performing instrumentation on the software program.

4. The method of claim 2, wherein the plurality of store instructions are inserted before the ISB and the plurality of restore instructions are inserted after the ISB.

5. The method of claim 2, wherein the ISB includes instructions to output one or more instruction addresses.

6. The method of claim 2, wherein the ISB includes a branch instruction to branch to a routine which comprises one or more instructions to output one or more of the plurality of addresses.

7. The method of claim 6, further comprising:
appending a binary file of the output routine to a plurality of binary files of the software program; and
providing the plurality of binary files of the software program with the binary file of the output routine to a linker.

8. The method of claim 1, wherein the plurality of instructions in the software program are discretely identifiable.

9. The method of claim 1, wherein one or more of the plurality of instructions in the software program are not discretely identifiable.

10. The method of claim 9, further comprising converting the software program into a format where the plurality of instructions are discretely identifiable.

11. A machine-readable medium embodying codes, the codes, when executed by a processor, causing the processor to perform a plurality of operations, the plurality of operations comprising:
receiving a software program having a plurality of instructions; and
performing instrumentation on the software program to determine a plurality of addresses of the plurality of instructions of the software program in the order in which the plurality of instructions are executed by a processor, comprising inserting a plurality of store instructions before one or more instructions of the plurality of instructions within the software program to store content of a plurality of registers of the processor and a plurality of restore instructions before the one or more instructions of the plurality of instructions to restore the content of the plurality of registers of the processor.

12. The machine-readable medium of claim 11, wherein performing instrumentation on the software program comprises inserting an instrumentation source block (ISB) before the one or more instructions of the plurality of instructions to determine one or more address of the one or more instructions in the software program.

13. The machine-readable medium of claim 12, wherein performing instrumentation on the software program further comprises providing an offset to the ISB to remove a skew in the one or more address caused by instrumentation of the software program.

14. The machine-readable medium of claim 12, wherein the plurality of store instructions are inserted before the ISB and the plurality of restore instructions are inserted after the ISB.

15. A system comprising:
a processor; and
a dynamic random access memory ("DRAM") device to store a first computer program, the first computer program including a first plurality of instructions, which when executed by a processor, causes the processor to perform a plurality of operations on a second computer program, the plurality of operations comprising
receiving the second computer program, the second computer program having a second plurality of instructions; and
performing instrumentation on the second computer program to determine a plurality of addresses of the second plurality of instructions of the second computer program in the order in which the second plurality of instructions are executed by the processor, comprising inserting a plurality of store instructions before one or more instructions of the plurality of instructions within the software program to store content of a plurality of registers of the processor and a plurality of restore instructions before the one or more instructions of the plurality of instructions to restore the content of the plurality of registers of the processor.

16. The system of claim 15, wherein performing instrumentation on the second computer program comprises inserting an instrumentation source block (ISB) before the one or more instruction of the second plurality of instructions to determine one or more address of the one or more instruction in the second computer program.

17. The system of claim 16, wherein performing instrumentation on the second computer program further comprises providing an offset to the ISB to remove a skew in the one or more address caused by performing instrumentation on the second computer program.

18. The system of claim 16, wherein the plurality of store instructions are inserted before the ISB and the plurality of restore instructions are inserted after the ISB.

19. The system of claim 16, wherein the ISB includes instructions to output the one or more address of the one or more instruction in the second computer program.

20. The system of claim 16, wherein the ISB includes a branch instruction to branch to a routine which includes one or more instructions to output the one or more address of the one or more instruction in the second computer program.

21. The system of claim 15, wherein the second plurality of instructions in the second computer program are discretely identifiable.

22. The system of claim 15, wherein the second plurality of instructions in the second computer program are not discretely identifiable.

23. The system of claim 22, wherein the plurality of operations comprises converting the second computer program into a format in which the second plurality of instructions are discretely identifiable.

* * * * *